O. JARVIS.
LOCK NUT.
APPLICATION FILED FEB. 19, 1919.

1,321,212.

Patented Nov. 11, 1919.

Inventor
Oscar Jarvis.

By F. P. Grin.

Attys.

UNITED STATES PATENT OFFICE.

OSCAR JARVIS, OF SEATTLE, WASHINGTON.

LOCK-NUT.

1,321,212.     Specification of Letters Patent.     Patented Nov. 11, 1919.

Application filed February 19, 1919. Serial No. 277,923.

*To all whom it may concern:*

Be it known that I, OSCAR JARVIS, a citizen of the United States, residing at Seattle, in the county of King and State of Washington, have invented certain new and useful Improvements in Lock-Nuts, of which the following is a specification.

This invention relates to an improvement in lock nuts, wherein a series of pawls are arranged to be completely housed within the nut as completed, which pawls act to coöperate with a groove in the bolt to prevent unscrewing movement of the nut.

In the drawing:—

Figure 1:
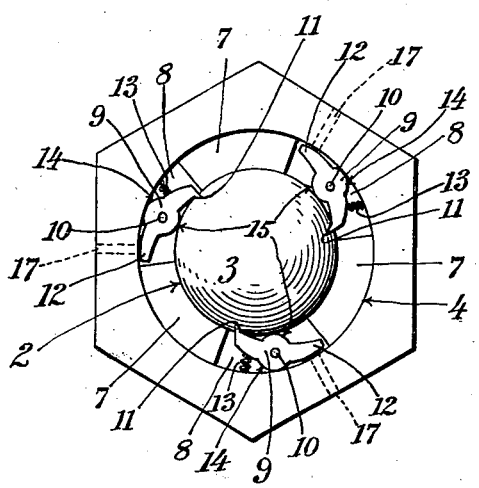
Figure 1 is a plan view of the lock nut in applied position on the bolt.
Figure 3:
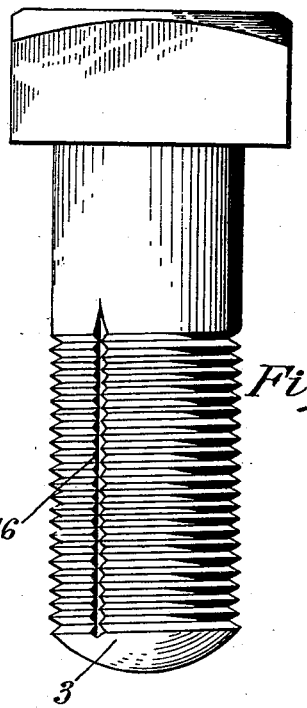
Fig. 3 is an elevation of the bolt.
Figure 2:
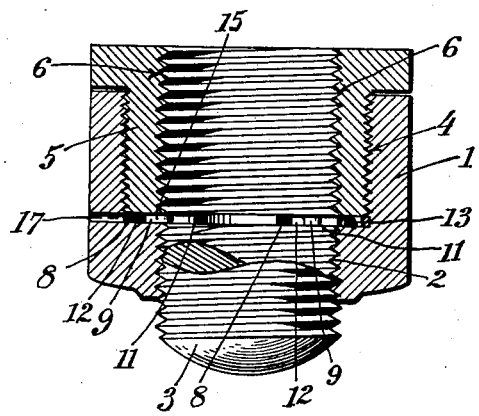
Fig. 2 is a vertical sectional view of the lock nut.
Figure 4:
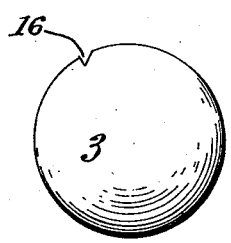
Fig. 4 is an end view of the bolt.

The improved lock nut, as herein shown, comprises a nut form body 1, centrally bored and threaded at 2, to receive the bolt 3. For the greater portion of the axial length of the nut, the bore 2, is diametrically enlarged, as at 4, and threaded throughout such enlargement, to receive a sleeve filler 5. This sleeve filler has an interior bore 6, corresponding to the nut bore 2, and correspondingly threaded to permit coöperation with the bolt threads.

The enlarged bore 4 of the nut forms an abrupt ledge or shoulder 7 interiorly of the nut, and a series of similar, equally-spaced recesses 8 are formed in this ledge, opening through the surface thereof. A pawl 9 is mounted in each of said recesses, upon a pivot pin 10, projecting from the bottom of the recess.

The pawls have a locking end or nose 11, preferably converging to narrow proportions in plan, and a rear or operating butt-end 12. A spring 13 may be arranged in rear of the locking end, and between the same and the wall of the recess to normally maintain the nose or locking end of the pawl projected within the bolt bore of the nut. The pawls are of such length as to accurately fit within the recesses, so as to prevent any play in the event the pivot pins 10, become worn or broken, and are further formed to more or less accurately maintain their pivoted relation with the recess should such pivot pins become worn or broken.

This last-noted advantage is provided by forming each pawl in rear of its pivot opening with a rounded portion 14 to bear against the rear wall of its recess, and in advance of such pivot opening with a rounded projection 15, adapted to bear against the rounded surface of the bolt. The pawl will thus be effectively supported for pivotal movement, and held in proper operative position, notwithstanding the wear or breakage of the pivots.

The application of the pawls in initial assemblage is obvious, the filler sleeve, when removed permitting convenient access to the pawls and recesses.

The bolt is formed with a longitudinally extending properly-formed groove 16, and it is apparent that, in screwing the nut on the bolt, the locking ends of the pawls will simply ride by the groove, while under unscrewing movement, one or the other of the pawls, through engagement of its locking end with the groove 16, will prevent such unscrewing movement.

The nut is formed in line with the pawl recesses, with openings 17, through which suitable tools may be introduced to bear on the butt ends of all pawls and force the locking ends thereof to release positions, when, as will be obvious, the nut may be readily unscrewed.

The jolting or vibration of the bolt with respect to its nut when in use upon an automobile, aeroplane, railroad track, or the like, causes the nut to move in and out between its free end and its head, and since movement of my improved nut toward the head of the bolt can occur but no reverse movement is possible, as I have above explained, it follows that during the ordinary oscillation incident to a bolt and nut, my improved nut will not come loose from its bolt but will on the contrary tighten itself thereon. I have made actual experiments to test this conclusion, and have physically proved it, the nut behaving in every instance as stated. My improved device in one instance was suspended from the chassis of an automobile with the nut very loosely screwed upon the bolt, an examination of which after a lapse of a few hours' driving of the automobile showed that the nut has worked its way toward the head of the bolt so that it was jammed tightly against the chassis.

While I have shown a particular form of embodiment of my invention, I am aware that minor changes therein will readily suggest themselves to others skilled in the art without departing from the spirit and scope of my invention. I therefore desire to avoid being limited to the exact form shown and described.

Having thus described my invention, what I claim is:—

1. A lock nut having a bolt receiving bore for a portion of its length, a relatively increased bore for the remainder of its length to thereby provide a ledge interiorly of the nut, bolt interlocking means mounted in the nut and normally projecting into the bolt receiving bore, a filler sleeve to fit the increased bore and bear on the ledge, said sleeve having an interior bolt bore to aline with the bolt bore of the nut, and a bolt with which the interlocking means coöperates to prevent said bolt from turning in one direction.

2. A lock nut having a bolt receiving bore for a portion of its length, a relatively increased bore for the remainder of its length to thereby provide a ledge interiorly of the nut, a series of pawls mounted in recesses formed in said ledge, and a filler sleeve to fit the increased bore and bear on the ledge, said sleeve having an interior bolt bore to aline with the bolt bore of the nut, in combination with a bolt having a longitudinal groove to be engaged by said pawls.

3. A lock nut having a bolt receiving bore for a portion of its length, a relatively increased bore for the remainder of its length to thereby provide a ledge interiorly of the nut, a series of pawls mounted in recesses formed in said ledge, a filler sleeve to fit the increased bore and bear on the ledge, said sleeve having an interior bolt bore to aline with the bolt bore of the nut, said pawls having rounded bearing portions to bear against the bolt and recess wall to pivotally support the pawls in movement, and a bolt having a longitudinal groove to be engaged by said pawls.

In testimony whereof I affix my signature.

OSCAR JARVIS.